United States Patent [19]
Fisch et al.

[11] Patent Number: 5,896,513
[45] Date of Patent: *Apr. 20, 1999

[54] COMPUTER SYSTEM PROVIDING A UNIVERSAL ARCHITECTURE ADAPTIVE TO A VARIETY OF PROCESSOR TYPES AND BUS PROTOCOLS

[75] Inventors: Matthew A. Fisch, Beaverton; James E. Jacobson, Jr., West Linn; Michael W. Rhodehamel, Beaverton, all of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/675,723

[22] Filed: Jul. 3, 1996

[51] Int. Cl.$^6$ .................................... G06F 13/14
[52] U.S. Cl. ................... 395/287; 395/500; 395/308; 395/309; 395/285; 395/840; 395/282; 395/527
[58] Field of Search ..................... 395/281, 282, 395/283, 308, 309, 287, 291, 293, 299, 728, 500, 527, 460, 462, 473, 446, 856, 857, 858, 284, 285

[56] References Cited

U.S. PATENT DOCUMENTS

| | | | |
|---|---|---|---|
| 4,839,797 | 6/1989 | Katori et al. | 364/200 |
| 5,297,272 | 3/1994 | Lu et al. | 395/500 |
| 5,353,415 | 10/1994 | Wolford et al. | 395/841 |
| 5,412,795 | 5/1995 | Larson | 395/550 |
| 5,490,279 | 2/1996 | Golbert et al. | 395/800 |
| 5,515,514 | 5/1996 | Dhuey et al. | 395/282 |
| 5,555,510 | 9/1996 | Verseput et al. | 395/282 |
| 5,581,782 | 12/1996 | Sarangdhar et al. | 395/800 |
| 5,586,270 | 12/1996 | Rotier et al. | 395/282 |

FOREIGN PATENT DOCUMENTS

| | | | |
|---|---|---|---|
| 0391537 | 3/1990 | European Pat. Off. | G06F 13/36 |
| 0396228 | 3/1990 | European Pat. Off. | G06F 13/36 |
| 0588021 | 7/1993 | European Pat. Off. | G06F 15/16 |

*Primary Examiner*—Meng-Ai T. An
*Assistant Examiner*—Raymond N Phan
*Attorney, Agent, or Firm*—Blakely, Sokoloff, Taylor & Zafman LLP

[57] ABSTRACT

A computer system providing a universal architecture includes a processor card connected to a system bus of a host computer system. The processor card is adapted for insertion into a slot of the computer system and houses a processor and a bus bridge conversion device. The processor operates according to a signaling protocol which is different than the signaling protocol of the computer system bus. The bus conversion device converts the signaling protocol of the system bus to the signaling protocol of the processor, and vice-versa. The bus conversion device includes logic for bus arbitration conversion, bus lock conversion, and cache coherency control. Logic is also included that converts incoming and outgoing requests so that the card may properly transact with other agents coupled to the bus.

20 Claims, 10 Drawing Sheets

COMPUTER SYSTEM PROVIDING A UNIVERSAL ARCHITECTURE ADAPTIVE TO A VARIETY OF PROCESSOR TYPES AND BUS PROTOCOLS

FIELD OF THE INVENTION

The present invention relates generally to the field of high-performance computer systems; particularly to signaling protocols and operational requirements associated with buses for use with advanced microprocessors.

BACKGROUND OF THE INVENTION

The development of ever more advanced microprocessors and associated bus architectures continues at a rapid pace. For example, Intel Corporation of Santa Clara, Calif., recently introduced their latest processor, the Pentium®Pro at a time when the market demand for the previous generation Pentium® processor was still expanding. The Pentium®Pro processor offers a great boost in performance over the previous generation Pentium® processor and it introduces a new high-performance, pipelined system bus architecture.

A dilemma arises for computer system developers who wish to design systems based on the latest bus architecture, but who still wish to accommodate processor designs based upon previous generation processors, or processors having alternate bus architectures. For instance, many system designers would like to design their computer systems so as to be compatible with Intel's new Pentium®Pro bus—to take advantage of state-of-the-art features—but who still must meet the current market demand for compatibility with the Pentium® processor architecture. This generally means that the system processor must have the same pinout and/or operate in accordance with the bus architecture designed for the Pentium® processor.

Unfortunately, the bus signaling protocol of the Pentium®Pro processor differs significantly from the bus signaling protocol of the Pentium® processor. As a result, system developers have been left with the unsavory choice of either maintaining compatibility with mainstream processor designs—while foregoing the advantages associated with a state-of-the-art bus architecture—or, designing their system in accordance with the signaling protocol of the advanced bus architecture of the Pentium®Pro processor—at the expense of reduced market acceptability due to the broader customer base for Pentium® processor-based systems. Therefore, what is needed, is a computer system architecture which is adapted for use with a variety of processor types, with each processor type potentially employing an alternate bus architecture.

As will be seen, the present invention overcomes the problems inherent in the prior art by providing a universal computer architecture that includes a processor subsystem (or module) coupled to a host through a standardized computer bus interface. The invention offers compatibility with a wide variety of processor types while obviating the need to modify basic system architecture. The present invention advantageously allows a previous generation processor (e.g., a Pentium® processor) to transfer information to/from other agents coupled to the high-performance (i.e., Pentium®Pro processor) system bus in a seamless manner.

SUMMARY OF THE INVENTION

The present invention covers a universal computer architecture comprising a processor subsystem which includes a processor and a bus conversion device for use with a host computer system that supports a standardized system bus. A standardized bus interface provides connection to the system bus and permits communication between the processor subsystem and the host. The host includes components such as a host processor, a main memory, periphery devices, etc. The processor within the subsystem operates in accordance with a specific bus interface that differs from the standardized bus interface of the host system. The bus conversion device provides conversion between the standardized bus interface of the host system and the specific bus interface of the processor.

In one embodiment, the processor subsystem is housed on a card that may be plugged or inserted into a slot of the host computer system. The card includes a processor that operates according to a specific signaling protocol, which is different than the signaling protocol of the system bus. A bus conversion device is coupled to the pins of the processor and the standardized bus interface of the card, which connects to the system bus. The bus conversion device converts the signaling protocol of the system bus to the signaling protocol of the processor subsystem, and vice-versa.

The host computer system, which interfaces to the processor subsystem, may support a variety of autonomous agents. These autonomous agents may comprise additional processors, various well-known devices such as direct-memory access (DMA) devices, or other subsystems. These agents communicate with one another via a pipelined system bus in one implementation. Agents coupled to the pipelined bus are classified as either symmetric agents or priority agents. The symmetric agents support a distributed arbitration scheme according to a circular priority algorithm.

The processor subsystem is classified as a symmetric agent on the pipelined bus and requests ownership of the bus on behalf of the processor in accordance with the circular priority algorithm. In a specific implementation, a round-robin algorithm may be employed. In most cases, priority agents may gain immediate ownership of the bus over any symmetric agent by sending a priority request signal on the bus.

BRIEF DESCRIPTION OF THE DRAWINGS

The present invention will be understood more fully from the detailed description which follows and from the accompanying drawings, which, however, should not be taken to limit the invention to the specific embodiments shown, but rather are for explanation and understanding only.

DETAILED DESCRIPTION

A universal computer architecture is described. According to the invention, a processor subsystem communicates with host computer system having an associated system bus architecture. The processor subsystem includes a processor housed on a plug-in card along with a bus conversion device that converts the signaling protocol of the processor to the signaling protocol of the system bus. In the following description, numerous specific details are set forth, such as agent types, logic blocks, signal connections, etc., in order to provide a thorough understanding of the present invention. Practitioners having ordinary skill in the data processing arts will understand that the invention may be practiced without many of these specific details. In other instances, well-known signal timings, components, and circuits have not been described in detail to avoid obscuring the invention.

Those skilled in the computer arts will further appreciate that the description that follows includes various terms which have specific, definite meaning within the relevant field. For instance, the term "standardized bus interface" is known by skilled practitioners to mean that the signal transmission between an agent and a bus follows a commonly used signaling protocol that applies throughout the system. Furthermore, the standardized bus interface does not necessarily refer to an industry standard of the type promoted by various professional organizations. Rather, the interface may be selected based on any one of a number of criteria. By way of example, an embodiment of the present invention is disclosed in which the standardized bus interface is based upon a high-performance bus architecture that provides backward compatibility with prior processor generations. In other instances, the standardized bus interface may be based upon a relatively simple bus architecture to reduce cost or to support a higher volume market with reduced component complexity.

Figure 1:
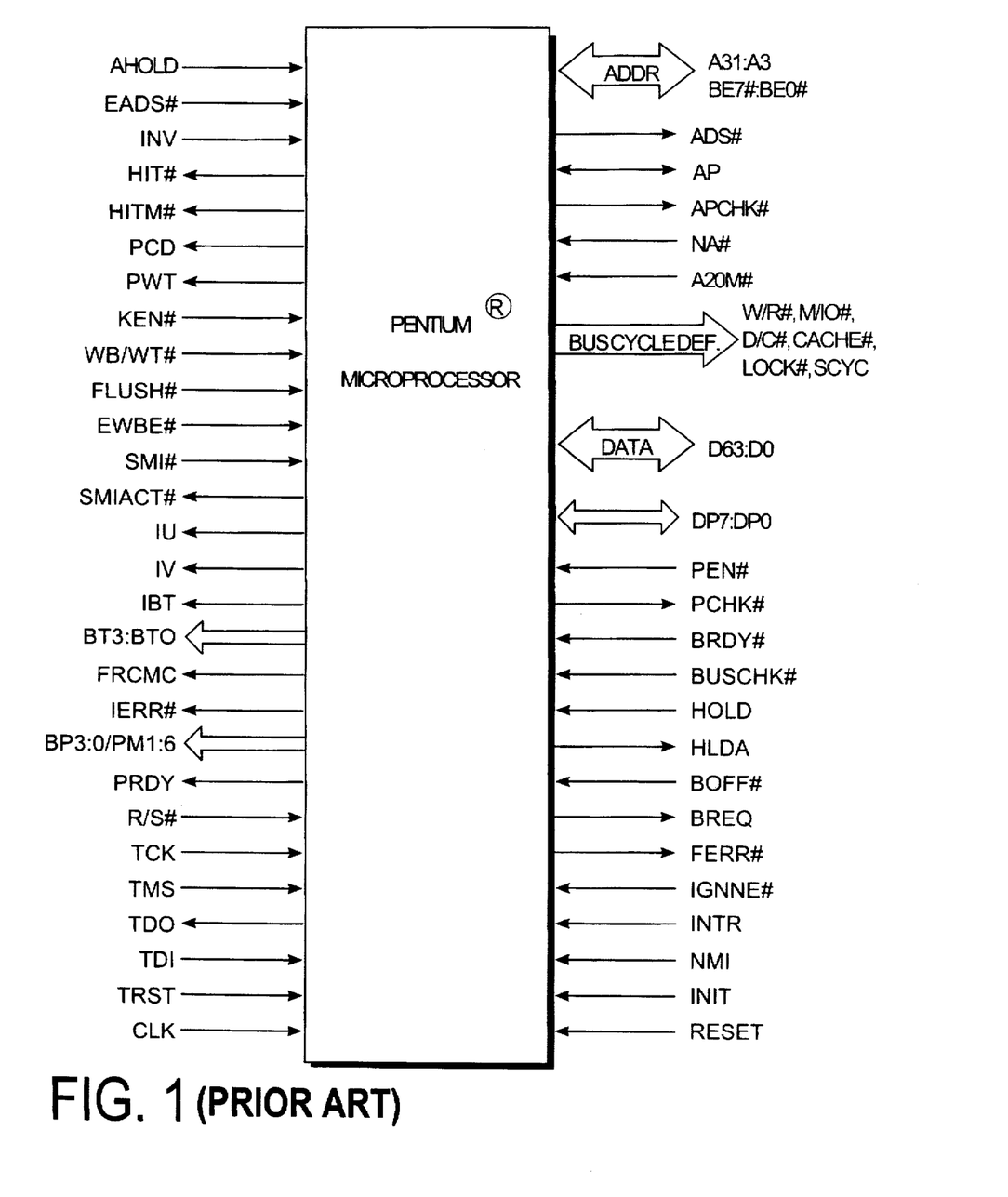
FIG. 1 illustrates the pinout of the Pentium® processor.

FIG. 1 illustrates the signal interface of Intel's Pentium® microprocessor. By way of background, a detailed explanation of the operation and functions of the signal shown in FIG. 1, as well as the bus signaling protocol associated with the Pentium® microprocessor, can be found in numerous publications. For instance, the book entitled, "*Pentium Processor System Architecture, Second Edition*", by Don Anderson and Tom Shanley, Addison-Wesley Publishing Company (1995) contains such a description.

Although the following discussion refers to the Pentium® microprocessor in exemplary embodiments of the present invention, it should be understood that there presently exist—or will exist in the future—other microprocessors that employ alternate internal architectures while remaining pin-compatible with the Pentium® microprocessor. Similarly, other processors provide signals having similar functions and have been designed with a different pinout, but which maintain compatibility with the bus architecture defined for the Pentium® microprocessor.

Therefore, reference to the Pentium® microprocessor in the present application should be taken to include these equivalents. To put it another way, the present invention is not limited to the Pentium® microprocessor; rather, the invention may be practiced with any of a variety of data processing devices. In addition, while the present invention is described in the context of a host system based upon the Pentium®Pro processor architecture, those skilled in the art should understand that processors having different architectures may be readily adapted to take advantage of the benefits offered by the present invention.

Figure 2:
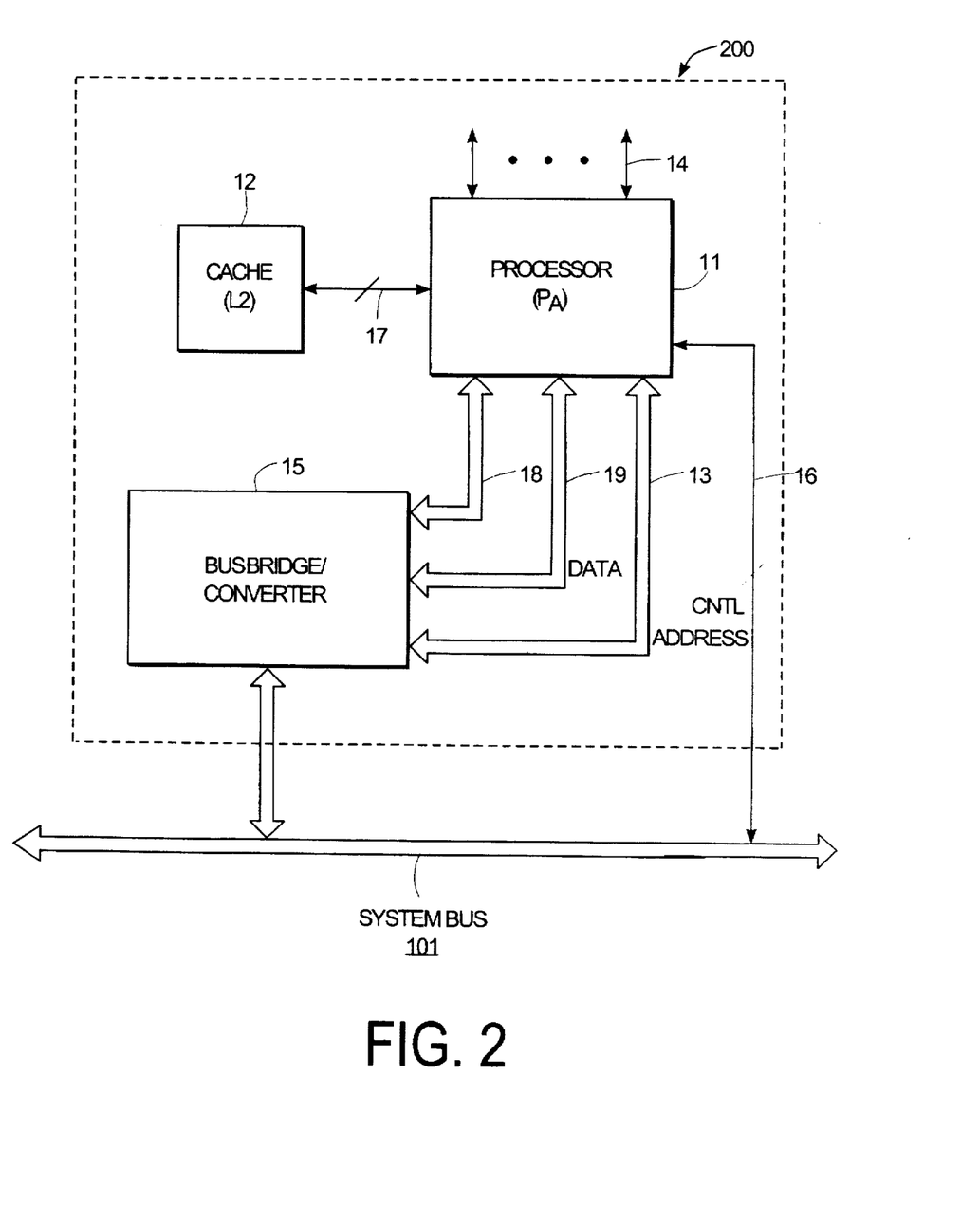
FIG. 2 is a high-level, block diagram of one embodiment of the present invention.

Referring now to FIG. 2, there is shown a high-level, block diagram of one embodiment of the present invention. In the embodiment of FIG. 2, a plurality of integrated circuit devices is mounted or housed on a printed circuit board (PCB) card (or module) 200. Card 200 includes a processor 11 coupled to one or more cache memories 12 along lines 17. Also included on card 200 is a bus conversion device 15 that is connected with processor 11 via lines 18, 19 and 13. Bus conversion device 15, in turn, is connected to system bus 101. In the described embodiment, system bus 101 comprises a high-performance pipelined bus having a standardized bus interface.

Data, address and control lines 19, 13 and 16, respectively, may be connected directly from processor 11 to system bus 101, or alternatively coupled through conversion device 15.

As will be described in more detail shortly, bus conversion device 15 functions to convert the bus signaling protocol and electrical characteristics associated with processor 11 to the signaling protocol and electrical characteristics associated with system bus 101, and vice-versa. In this way, information may be transferred between the processor and other agents coupled to system bus 101. (Note that signal lines 14 are intended to represent that there may be other inputs/output lines to processor 11 coupled to other devices included on card 200. For example, lines 14 may include clock input signals, operating potential supply lines, connections to additional integrated circuits, etc.)

Figure 3:
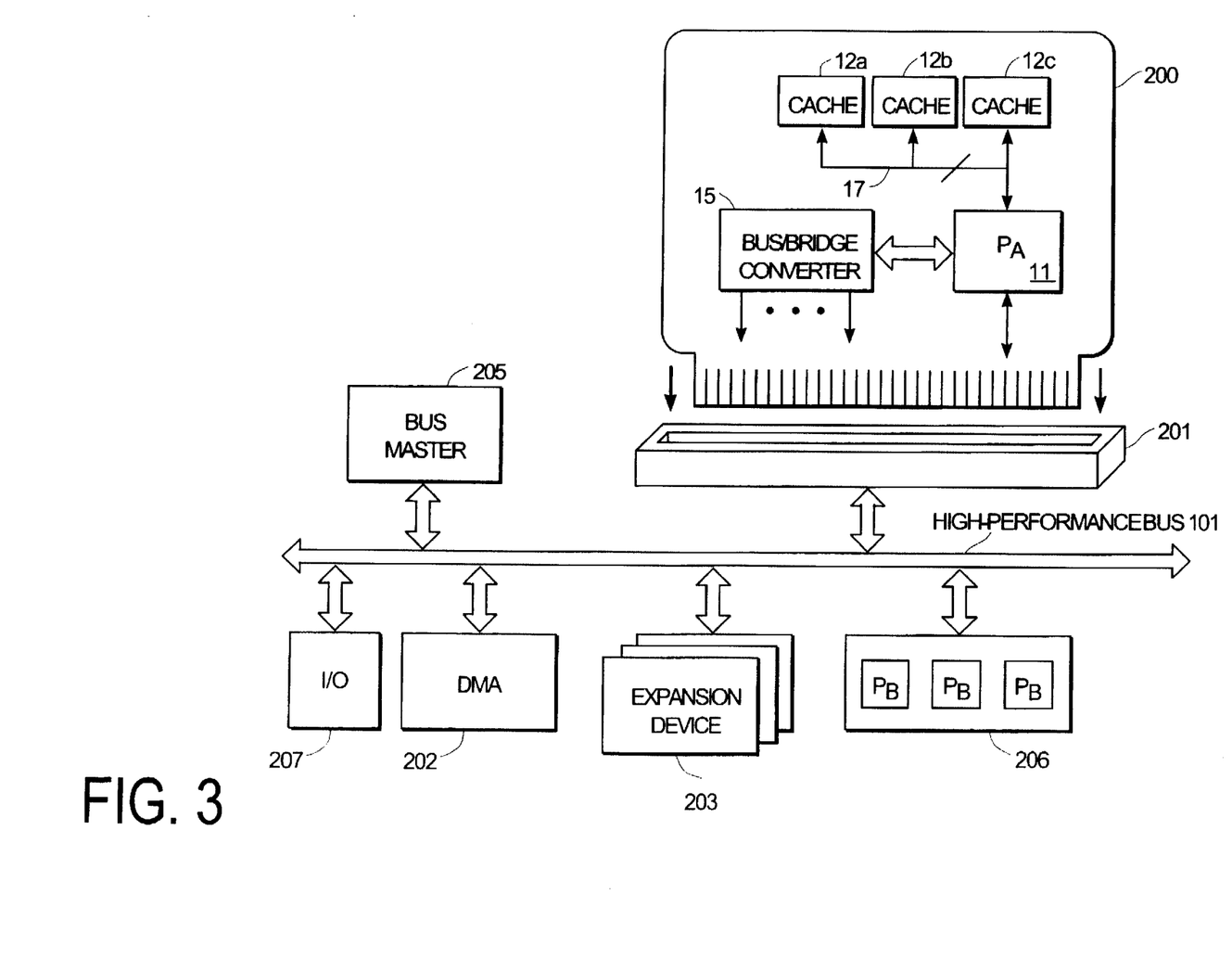
FIG. 3 shows an embodiment of the invention in a computer system which includes multiple agents coupled via a high-performance bus.

With reference now to FIG. 3, there is shown an embodiment of the present invention in a computer system which includes multiple agents coupled to a high-performance bus 101. In the embodiment of FIG. 3, bus 101 comprises a pipelined bus having an architecture such as that designed for the Pentium®Pro processor. Processor card 200 is illustrated as having a plurality of interface terminals disposed along one edge. These terminals plug into a mated connector 201 having a slot with a set of corresponding terminal connections. For example, this configuration may represent a daughtercard that connects to a motherboard via an available slot within the computer system. This structure permits high-performance bus 101 to interface to a number of processor cards, each of which may include any of a variety of different processors.

As can be seen, processor card 200 comprises a processor ($P_A$) 11 coupled with cache memories $12a$–$12c$, and also interconnected to bus 101 via bus conversion device 15. Other devices coupled to bus 101 include bus master 205, direct memory access (DMA) device 202, I/O device(s) 207, expansion devices 203 and a group of processors ($P_B$) organized into a cluster 206. By way of example, processors $P_B$ may comprise Pentium®Pro processors compatible with the bus architecture of pipelined bus 101. Thus, a multiprocessor (MP) system is illustrated in the computer system of FIG. 3.

For purposes of the following discussion, high-performance bus 101 may be taken to designate the Pentium®Pro processor bus of Intel Corporation. The signaling protocol associated with the Pentium®Pro processor bus is set forth in the publication, "Pentium®Pro Processor Family Developer's Manual, Volume 1: Specifications" (1996), which publication is available from Intel Corporation by calling 1-800-879-4683, and which publication is herein incorporated by reference. To better understand certain aspects of the present invention, however, various attributes of the Pentium®Pro processor bus will be discussed as they pertain to the invention.

To begin with, it should be understood that according to the bus arbitration protocol of the Pentium®Pro processor bus, there are two classes of bus agents: symmetric agents and priority agents. Symmetric agents support fair, distributed arbitration using a round-robin (i.e., circular priority) algorithm. Each symmetric agent has a unique agent identification (ID) that is assigned at RESET; a rotating ID value that reflects the symmetric agent with the lowest priority for the next arbitration event; and a symmetric ownership state indicator that indicates either a "busy" or an "idle" state. In the embodiment of FIG. 3, for instance, processor card 200 appears as one of several symmetric agents coupled to bus 101.

In a typical system configuration, such as that shown in FIG. 3, symmetric agents may include devices such as processors $P_B$, organized individually or into a cluster 206, bus master 205, and various expansion devices 203, shown coupled to bus 101. In the computer system of FIG. 3, direct memory access (DMA) device 202 may function as a high priority agent since it normally requires a direct path to memory. In other configurations, the priority agent(s) may comprise a high priority arbiter that arbitrates on behalf of multiple I/O devices, as depicted by I/O block 207 in FIG. 3.

An arbitration event is the process by which a new symmetric bus owner is determined and changed. On every arbitration event, the symmetric agent with the highest priority becomes the symmetric owner. Note that the symmetric owner is not necessarily the overall bus owner since a priority agent, having a higher priority than any symmetric owner, may grab ownership of the bus from a symmetric agent. Once the priority agent arbitrates for the bus, it prevents the symmetric owner from entering into a new request phase unless the new transaction is part of an ongoing bus locked operation. Bus locked operations are atomic operations which cannot be interrupted. An example of such a bus operation is a read-modify-write cycle.

Figure 4:
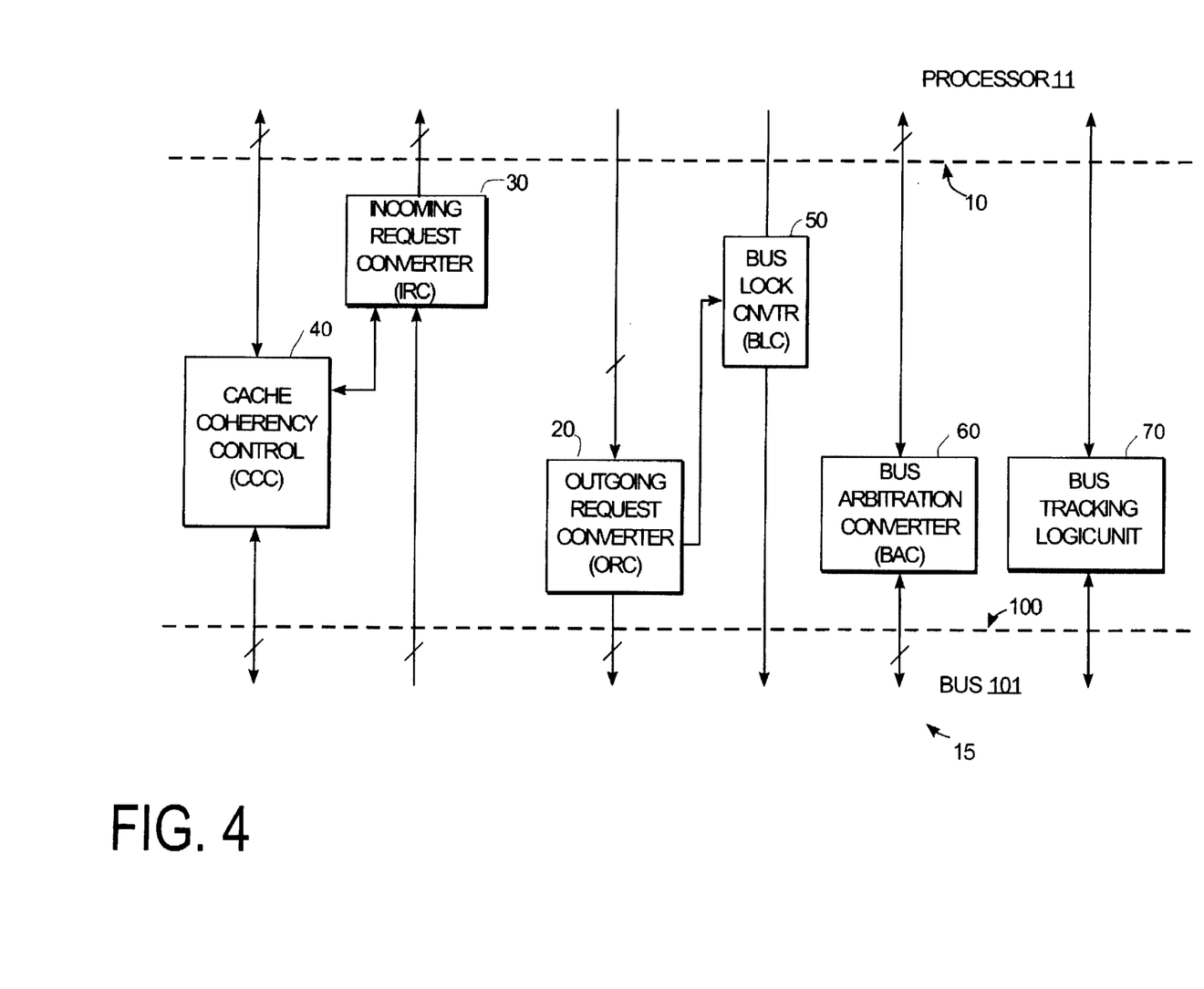
FIG. 4 is a conceptual block diagram of one embodiment of the bus conversion device shown in FIG. 2.

With reference now to FIG. 4, there is shown a conceptual block diagram of one embodiment of the bus conversion device 15, previously shown in FIGS. 2 & 3. Dashed lines 10 and 100 represent the bus signal interface between converter 15 in both processor 11 and bus 101, respectively. Practitioners in the art will understand that each of interfaces 10 and 100 may include data and address latches, voltage translations circuits, signal conversion logic, etc., as necessary for translating and converting the voltage and logic levels associated with each of the respective bus interfaces.

Bus conversion device 15 also includes a bus tracking logic unit 70, which interfaces to pipeline bus 101; included in bus tracking logic unit 70 is an interface unit in-order queue (IOQ) 71. The IOQ 71 is a standard logic block associated with the Pentium®Pro processor bus which keeps track of the current state of bus 101. All bus agents maintain identical IOQ status to track every transaction that is issued to the bus. When a transaction is issued to the bus, it is also entered in the IOQ of each agent.

Figure 10:
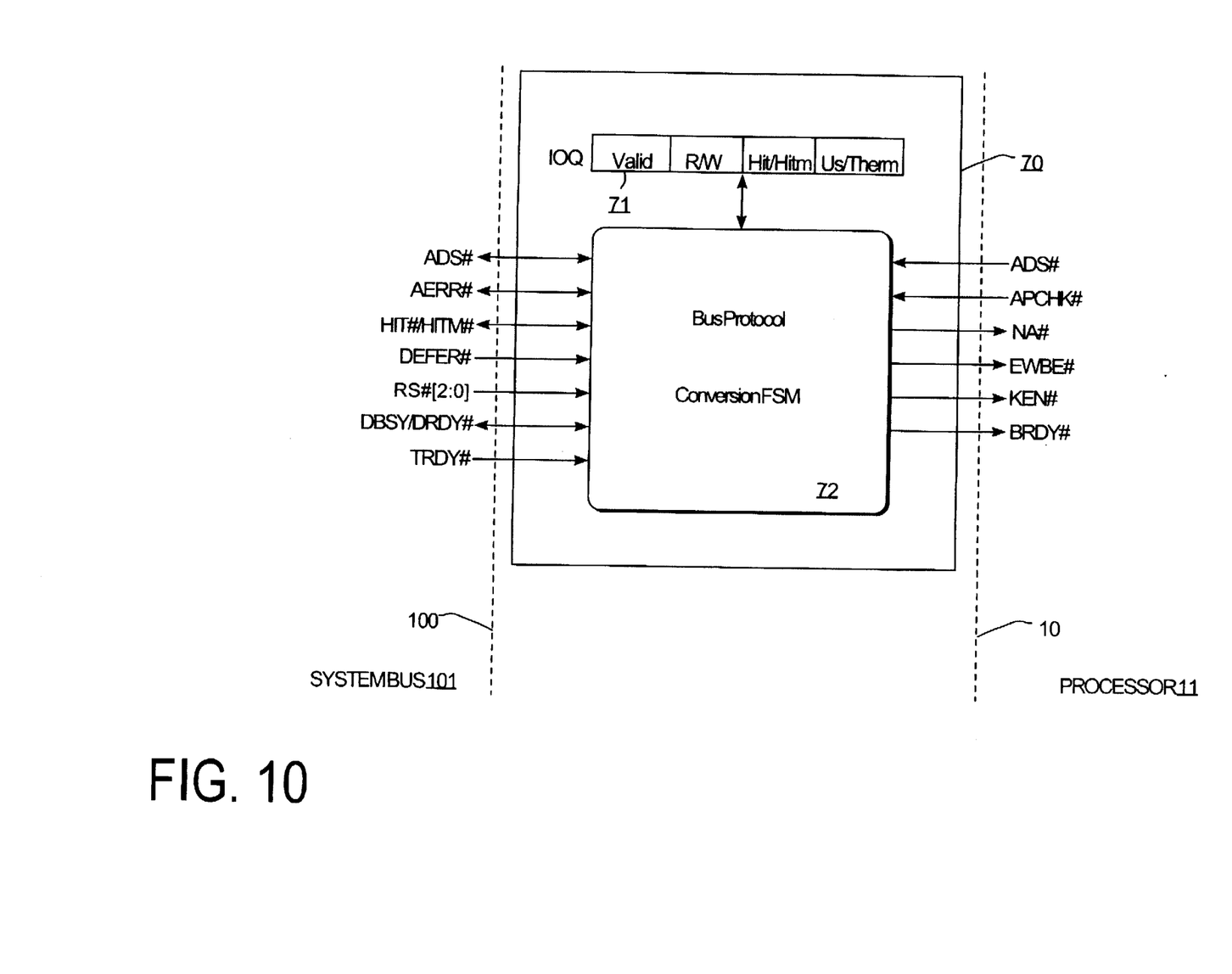
FIG. 10 illustrates the bus request protocol conversion logic unit utilized in one embodiment of the present invention.

With reference to FIG. 10, the depth of IOQ 71 is the limit of how many in-order transactions can be outstanding on the bus simultaneously. Because transactions receive their responses and data in the same order as they were issued, the transaction at the top of IOQ 71 is the next transaction to enter the response and data phases. After completion of the response phase, a transaction is removed from the IOQ. The IOQ is also responsible for sending signals such as HIT#/HITM#, DRDY#, DBSY#, as well as other bus protocol signals. The default depth of the IOQ is eight; however, bus agents may configure IOQ 71 to a depth of one by activation of pin A7# on RESET#.

Included within bus conversion device 15 is a bus arbitration converter (BAC) 60 that converts the arbiter signals associated with the different bus protocols. For example, BAC 60 allows processor 11 to gain control or ownership over pipelined bus 101 by having its arbiter signals properly converted to the bus protocol associated with bus 101.

Figure 5:
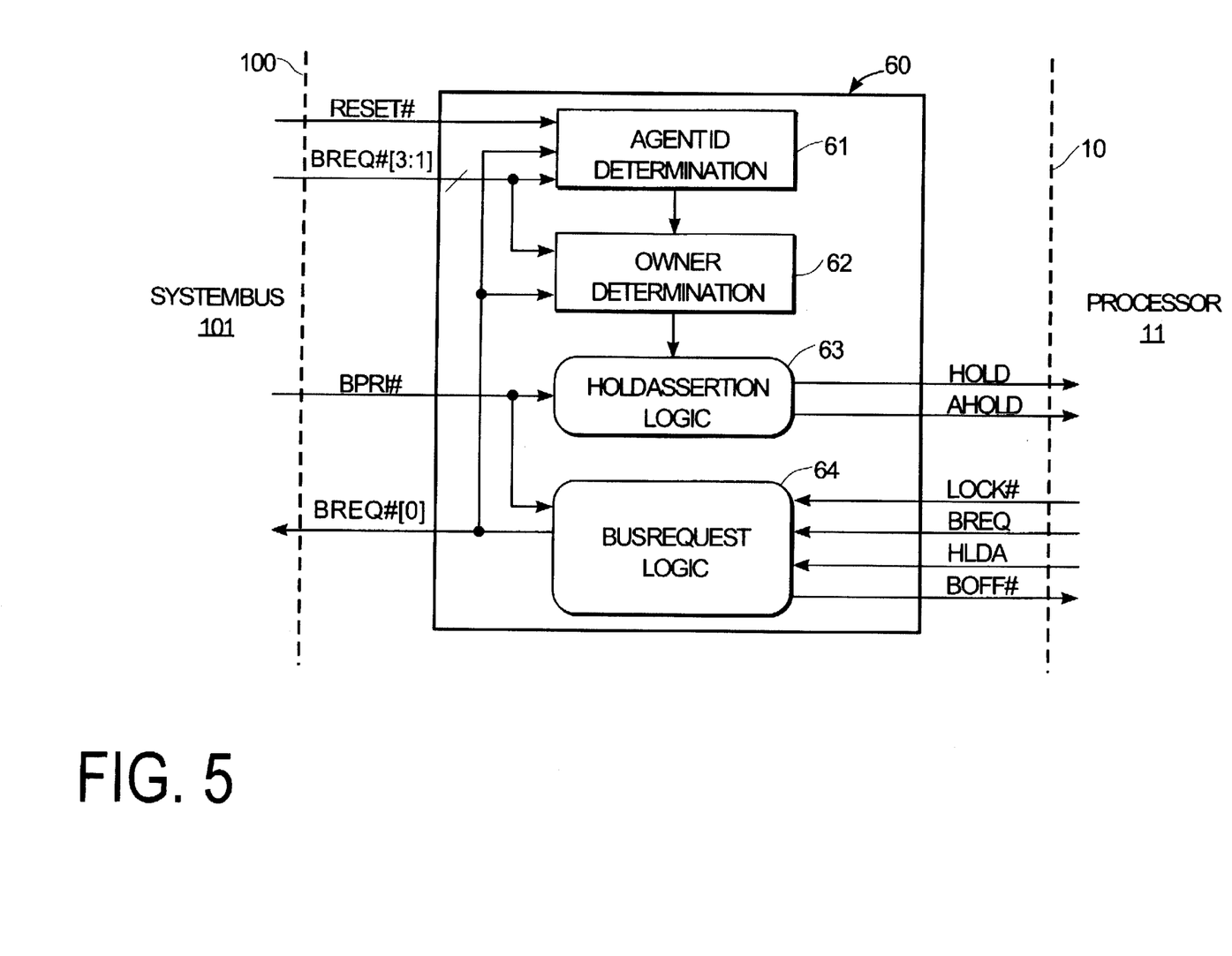
FIG. 5 illustrates one embodiment of the arbitration converter circuit shown in FIG. 4.

A detailed block diagram of bus arbiter converter 60 is illustrated in FIG. 5. Included within BAC 60 are agent identification (ID) determination state machines 61, symmetrical owner determination state machine 62, hold assertion logic 63, and bus request logic 64. It is appreciated that in the symmetric arbitration scheme of system bus 101, each agent requesting access to the bus must assert an appropriate request (BREQ#) signal. For example, processor 11 may indicate its intention to send a request to bus 101 by driving the BREQ# signal line in accordance with the bus protocol of processor 11.

The signals BREQ, LOCK#, and HLDA are output from processor 11 to bus request logic 64. (Note that each signal that assumes a logic low state when asserted is followed by the pound sign, #. By way of example, the LOCK# signal is asserted low when processor 11 is performing an atomic transaction.)

The BREQ signal is the bus request output asserted by processor 11 to inform bus request logic 64 that it needs to obtain ownership of bus 101 in order to perform a bus cycle. The HLDA signal is a hold acknowledge output asserted by the processor 11 to inform other requesting devices that it no longer owns the bus. According to the bus protocol associated with processor 11, HLDA is not asserted until all outstanding bus cycles (i.e., that have been previously pipelined) have completed. The bus request logic 64 converts the bus request signal generated by processor 11 into the BREQ#[0] signal compatible with the bus request signal associated with the protocol of system bus 101.

In one embodiment, bus arbiter converter 60 gains ownership of bus 101 as a symmetric agent in accordance with the round-robin arbitration scheme implemented on the Pentium®Pro processor bus. In order to properly connect to bus 101, each symmetric agent must be assigned a symmetric agent identification (ID). This is the purpose of agent ID determination finite state machine 61. Upon power-on or reset, symmetrical agent ID determination state machine 61 receives the BREQ#[3:0] signal lines so as to determine the agent ID assignment of processor card 200. The agent ID information is provided to the symmetrical owner determination state machine 62.

To gain ownership of system bus 101, the symmetric agent BREQ#[0] signal is asserted and the symmetrical owner determination state machine 62 examines the state of the bus to figure out when ownership may be obtained as a symmetric agent in accordance with the bus protocol of the Pentium Pro® processor bus. The bus arbitration signals associated with system bus 101 include BREQ#[3:0], BPRI#, LOCK# (shown in FIG. 7), and RESET#. The BREQ#[3:0] bus signals are connected to the symmetric agents—including bus conversion device 15 of processor card 200—in a rotating manner. This arrangement initializes every symmetric agent with a unique Agent ID during power-on or RESET. Bus request signals BREQ#[3:0] provide a mechanism by which individual symmetric agents send and receive bus ownership requests to arbitrate for ownership of a system bus 101.

The BPRI# signal is a priority request signal whereby a symmetric agent receives bus ownership requests from a high priority bus agent. For example, BPRI# may be asserted by a priority agent so that it can arbitrate for immediate ownership of bus 101. The symmetric agents coupled to bus 101 receive the BPRI# signal as an indication that a priority agent is requesting ownership of the bus.

Upon an arbitration event on bus 101, processor card 200 may become a symmetric owner of the bus if it currently has the highest priority in the system. A priority agent may subsequently request the bus and obtain ownership over processor card 200. For example, I/O device 207 (see FIG. 3) may obtain ownership of the bus from daughtercard 200 by asserting BPRI#, unless, of course, processor card 200 is performing an atomic transaction and has asserted the LOCK# signal. Processor card 200, of course, may be designated a priority agent in an alternative embodiment.

Hold assertion logic 63 is coupled to receive the BPRI# signal from bus 101 and generate HOLD and AHOLD signals input to processor 11. When the BPRI# signal is asserted on the bus 101, this means that a high priority agent is intervening to obtain ownership of the bus. In response to the BPRI# signal, hold assertion logic 63 informs processor 11 not to issue any more requests.

Note that the AHOLD (address hold) signal causes processor 11 to cease driving its address bus, so that the processor is unable to control bus cycles. Therefore, driving the HOLD and AHOLD signals allows bus conversion device 15 to operate with other symmetric agents on bus 101. This forces processor 11 to not own the bus by default, whereas, in the bus architecture of the Pentium® processor, the processor owns the bus by default. In a system configuration with multiple processors or agents, use of the HOLD and AHOLD signals eliminates the possibility of two or more processors backing off each other, thereby leading to a "live lock" situation.

Bus request logic 64 also generates the BOFF# signal input to processor 11 to cause processor 11 to immediately release control of the bus in the event that a high priority agent requests ownership of the bus using the BPRI# signal. After the BOFF# signal is removed, processor 11 restarts the entire bus cycle.

In an alternative embodiment, processor card 200 functions as a high priority agent, instead of a symmetrical agent, in the computer system.

Figure 6:
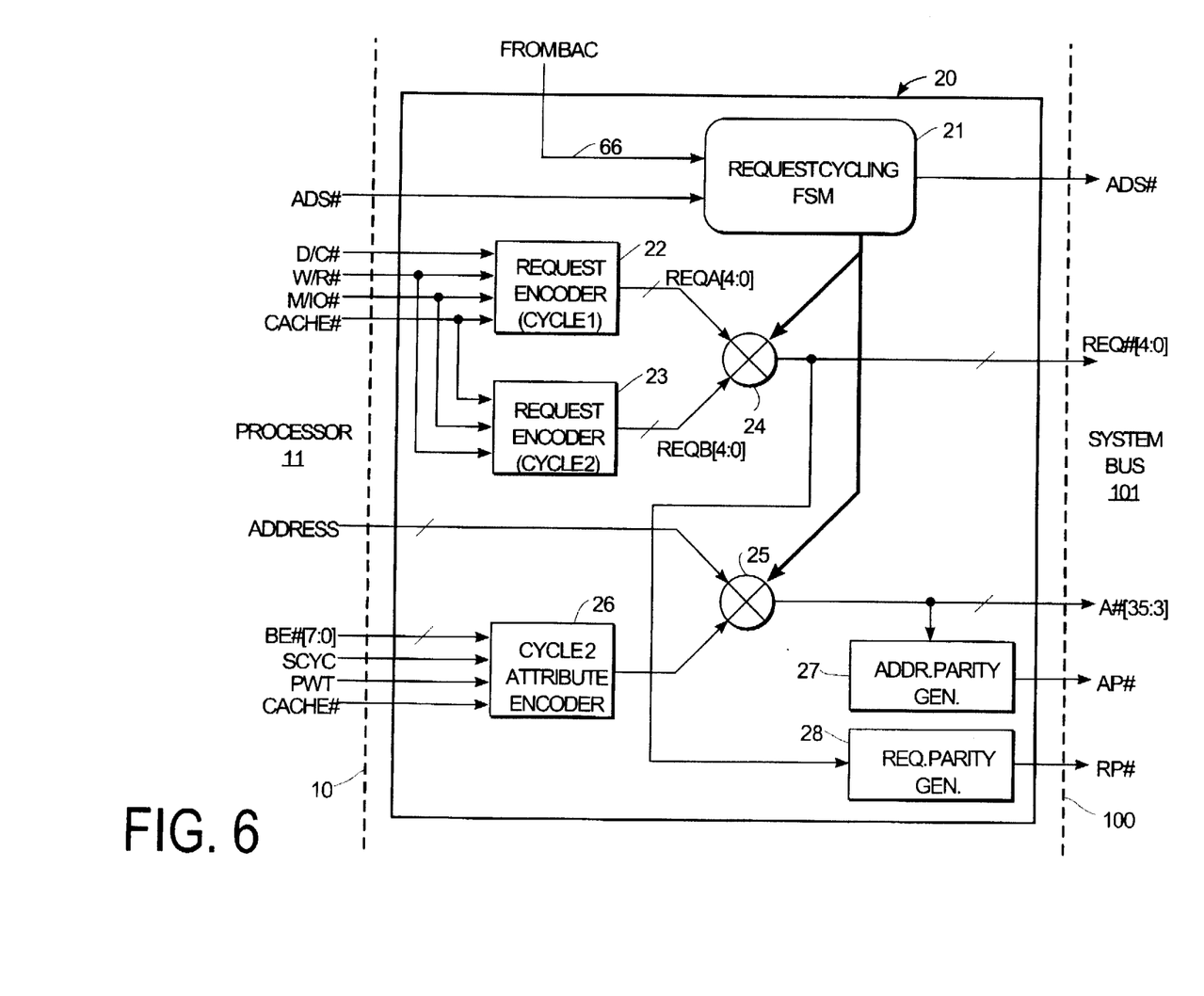
FIG. 6 is a block diagram of one embodiment of the outgoing request converter circuit shown in FIG. 4.

With reference now to FIGS. 4 & 6, bus conversion device 15 further comprises outgoing request converter (ORC) 20 which converts requests generated by the processor 11 to issue on system bus 101. In an exemplary embodiment, once ownership of bus 101 has been obtained by the Pentium® processor, the outgoing request encodings must be translated from the protocol of the Pentium® processor to the signaling protocol of the Pentium®Pro processor bus 101. Further, the Pentium®Pro bus implements a two-clock request cycle, whereas the Pentium® processor operates with only one clock cycle. Therefore, ORC 20 is responsible for properly sequencing requests issued by processor 11 as well as converting to different request type pins from the Pentium® to the Pentium®Pro processor bus.

Outgoing request converter 20 includes request cycling finite state machine 21, request encoders 22 and 23, and attribute encoder 26. The request cycling state machine 21 receives a signal on line 66 from BAC 60 indicating that processor 11 has obtained ownership of bus 101. At this point, processor 11 may assert its ADS# (address status) output signal to indicate a valid address and bus cycle definition are present.

State machine 21 utilizes this information to generate control signals coupled to multiplexer circuitry circuits 24 and 25 for the various request and encoding changes so that the single cycle processor requests can be properly sequenced as two separate clock cycles on system bus 101. The encoding for the two request cycles is performed by blocks 22 and 23, which receive as inputs the write/read (W/R#) signal, the memory or I/O transaction (M/IO#) signal and the bus cycle definition (CACHE#) signal from processor 11. The CACHE# signal is asserted by the processor during cache write-back cycles, and also to notify external memory that the processor wishes to perform a cache line-fill using a burst bus cycle.

In addition, request encoder 22 receives the D/C# (data/code) signal to indicate the type of read operation requested.

The encoded output signals produced by blocks 22 and 23 are input to multiplexer 24. The output selected from multiplexer 24 is controlled by the request cycling state machine 21, as shown in FIG. 6. When an ADS# signal is issued onto bus 101 by request cycling state machine 21, the various request types from processor 11 are encoded during the first cycle by encoder 22. At this time, address signals provided by processor 11 are selected for output onto the system bus address lines, A# [35:3], via multiplexer 25. Basic information about the request type is also placed onto the system bus 101 via the REQ#[4:0] lines during the first cycle. Request encoder 22 may be implemented using ordinary combinatorial logic that converts the Pentium® type pins into appropriate request-type signals on the Pentium®Pro processor bus, according to one embodiment of the present invention.

During the second clock cycle, multiplexer 24 selects the Reqb[4:0] output of encoder 23 for output onto the system bus 101. Also during the second cycle, the address signal lines are utilized to send additional information about the request type to the pipelined bus. This information includes various attributes of the request type such as the byte enable signal lines (BE#[7:0]); a split cycle (SCYC#) signal that notifies logic that the locked transfer request is twice the number of bus cycles expected; the page write-through (PWT) signal that specifies whether the L2 cache should use a write-back or write-through policy for the line being written to; and the CACHE# signal. This information is selected as the output onto the address lines of system bus 101 by multiplexer 25 during the second cycle.

In a system configuration which includes a responding agent capable of deferring a transaction (i.e., causing it to complete out-of-order) ORC 20 should include logic that de-asserts the DEN# signal line with each request issued on bus 101. The DEN# signal is the defer-enable signal, and is driven on bus 101 on the second clock of the request phase on the EXF1#/Ab4# pin (i.e., bit 4 of the second cycle address pins). This signaling logic, for example, may be included in the ordinary combinatorial logic of state machine 21. De-asserting DEN# with each outgoing request prevents any responding agent from deferring a transaction.

Address parity and request parity signals are also generated by blocks 27 and 28, respectively, onto bus 101 as part of an outgoing request.

Bus conversion device 15 further includes a bus lock converter (BLC) circuit 50 that enables the bus to be locked during atomic transactions; that is, transactions over several clock cycles that cannot be interrupted. Although the lock protocol for the Pentium® processor is similar to the lock signaling protocol implemented on the Pentium®Pro processor bus, exactly when a lock can be asserted in relation to the respective bus protocols varies.

Figure 7:
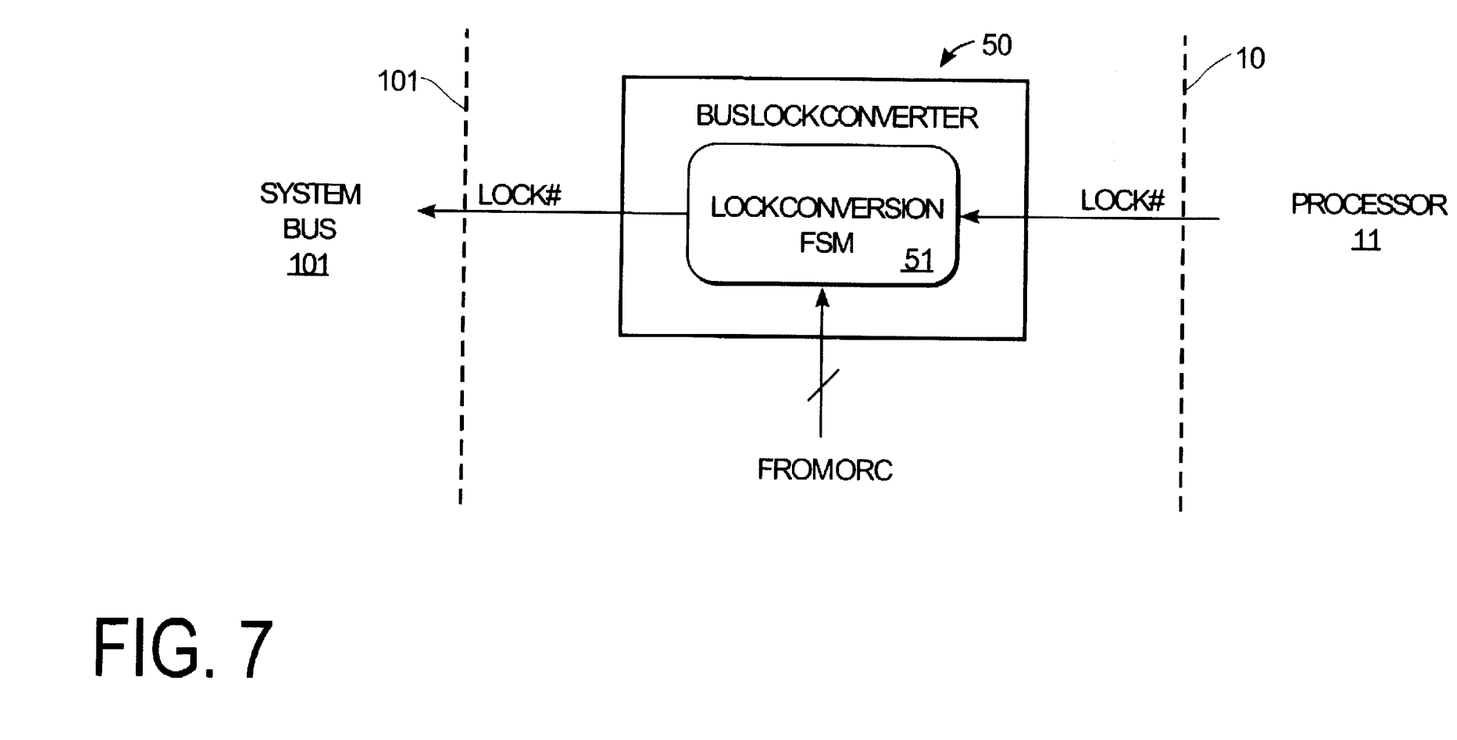
FIG. 7 shows an embodiment of the bus lock converter illustrated in FIG. 4.

FIG. 7 illustrates a bus lock converter comprising a lock conversion finite state machine 51 that receives a LOCK# signal from processor 11, as well as an input from ORC 20. In system bus 101, the LOCK# signal is a bidirectional signal bused among all agents. According to the bus arbitration protocol of the Pentium®Pro processor, a current bus owner may assert LOCK# to define an indivisible bus locked operation.

Shortly after processor 11 asserts its LOCK# signal, system bus 101 receives the translated LOCK# signal from the lock conversion state machine according to the signaling protocol of bus 101. State machine 51 basically implements a variable delay—waiting for signals such as ADS#, etc., to be generated by ORC 20 before it asserts the corresponding LOCK# signal on bus 101. The LOCK# signal on bus 101 lasts through the series of atomic transactions and then is deasserted after the transactions have been completed. Again, the de-assertion is performed in accordance with the appropriate signaling protocol of bus 101.

As can be seen in FIG. 4, bus conversion device 15 also includes an incoming request converter (IRC) 30 for converting signal requests on the system bus into signals that can be input into processor 11. According to the signaling protocol of the Pentium® processor, an external address strobe (EADS#) signal is asserted to tell the processor that a valid address is present on its local address bus, and that this address can be snooped. When the snoop is activated, the processor transfers the memory address from the bus to the cache directories and a look-up takes place. But because the Pentium Pro® processor bus does not include an EADS# signal, or its equivalent, the present invention implements the following scheme.

Since pipelined bus 101 is commonly a multi-agent system bus, an ADS# signal on the bus indicates a request by one of the multiple agents. All agents coupled to the bus simply observe these requests, and, depending upon the request type, determine whether it is appropriate to snoop bus 101, and also what to do with the information.

Figure 8:
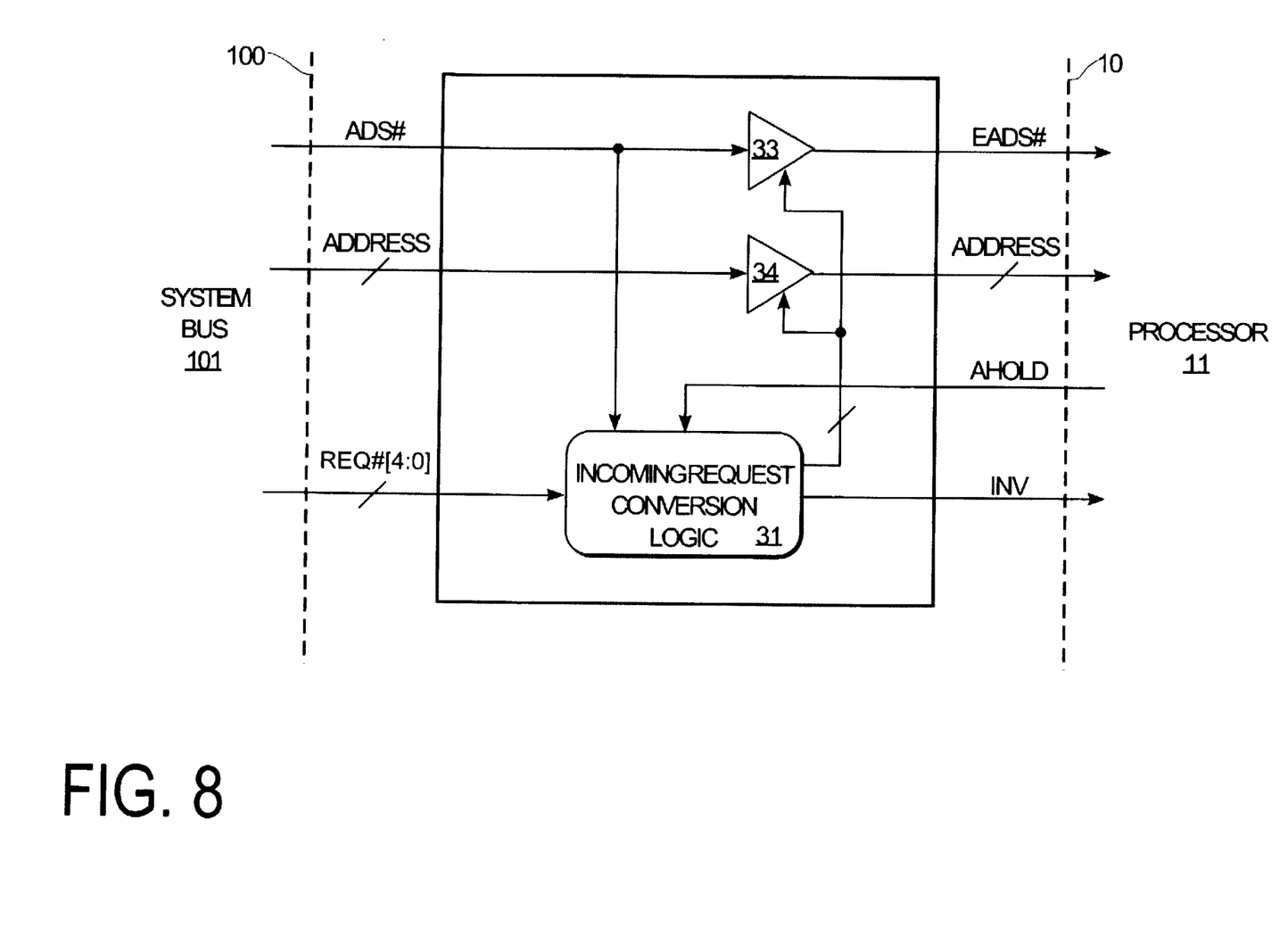
FIG. 8 shows an embodiment of the incoming request converter of FIG. 4.

As shown in FIG. 8, IRC 30 includes an incoming request conversion logic block 31 that receives request signals REQ#[4:0] from system bus 101. Logic block 31 also receives ADS# signal from bus 101. Incoming request conversion logic 31 functions to determine if a request on bus 101 is snoopable by processor 11. If the current transaction on system bus 101 is snoopable, logic block 31 causes EADS# to be driven into the processor along with the address information. Note that IRC logic block 31 controls tri-state buffers 33 and 34 to assert/de-assert the EADS# signal and the address pins of processor 11.

Incoming request conversion logic block 31 also generates the invalidate (INV) signal to direct processor 11 to either leave the cache line valid, or to mark it invalid in the case of a snoop hit. In the event that the cache line contains valid data, the line is placed in a Shared cache coherency state. Note that logic block 31 should make sure that the address hold (AHOLD) signal is asserted so that processor 11 can properly snoop the address bus. This insures that cache consistency is maintained.

At this point it should be understood that the implementation of IRC 31 shown in FIG. 8 assumes that system bus 101 has been de-pipelined for purposes of signal convention.

In alternative embodiments of the present invention, it may be desirable not to de-pipeline bus 101. In such an implementation, bus conversion device 15 would further include a queuing mechanism that would send all snoops to processor 11 while periodically stalling system bus 101.

Also note that IRC 31 includes snoop control logic which prevents 36-bit requests on system bus 101 from being sent to the processor interface. For example, the Pentium® processor is limited to 32-bit requests. Therefore, IRC logic block 31 insures that requests which are greater than 32-bits are not snooped by processor 11.

Figure 9:
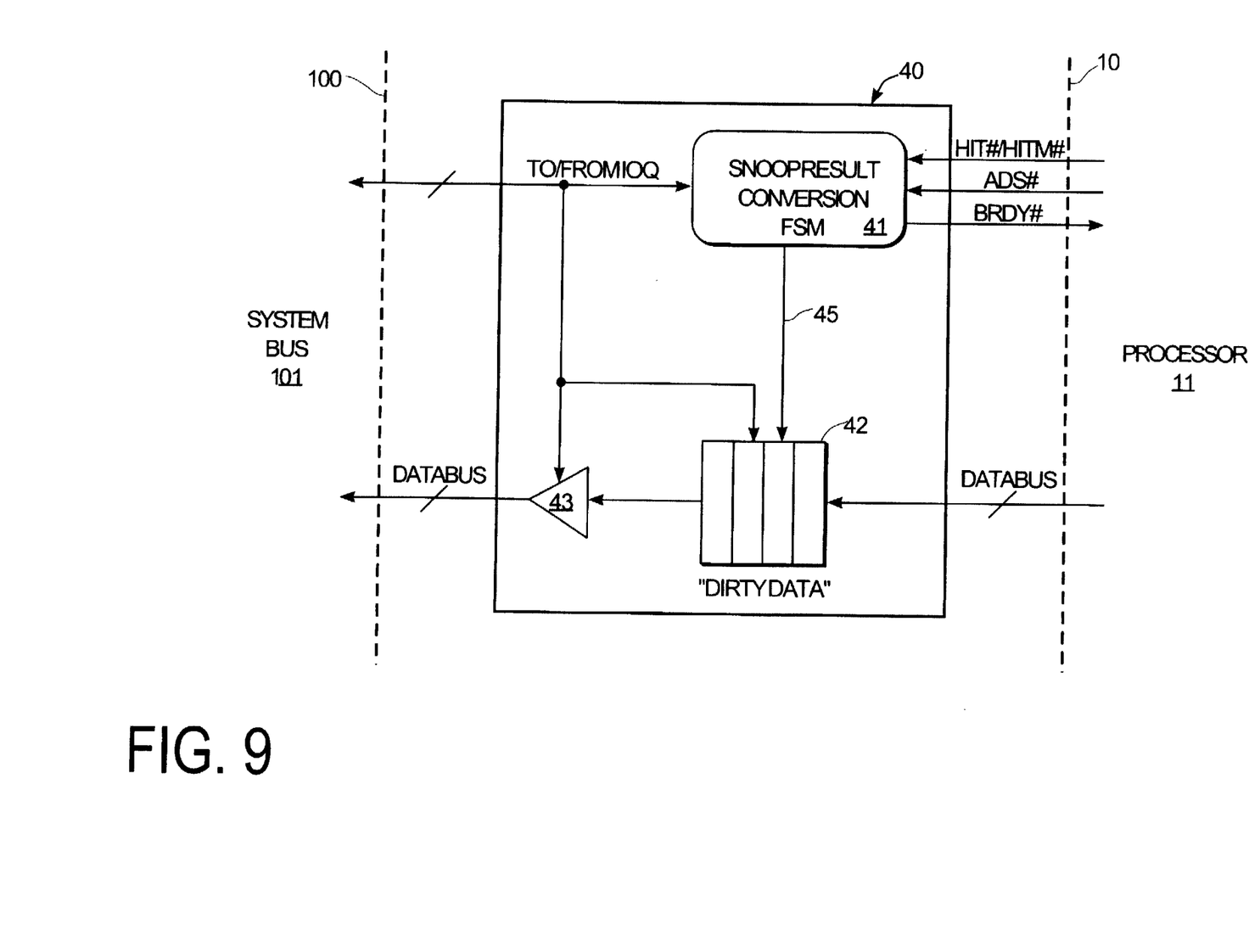
FIG. 9 is a block diagram of one embodiment of the cache coherency control unit shown in FIG. 4.

FIG. 9 is a detailed diagram of the cache coherency control unit (CCC) 40 shown in the bus conversion device 15 of FIG. 3. The embodiment of FIG. 9 shows CCC 40 comprising snoop result conversion state machine 41 coupled to dirty data buffer 42, which, in turn, drives the data bus through tri-state buffers 43. Once IRC 31 has signaled to state machine 41 that a snoop has been driven into processor 11, a few clocks later the processor provides signals to CCC 40 indicating that either a cache hit, a cache hit to a dirty line, or a cache miss has occurred. This information is signaled via signal lines HIT/HITM and ADS.

Snoop result conversion state machine 41 also communicates with the input-order queue (IOQ) associated with bus 101. The IOQ monitors the system bus and sends appropriate signals to the state machine and tristate buffer 43 so that the data may be transferred to bus 101 in accordance with the signaling protocol of bus 101. In one embodiment, IOQ comprises ordinary bus state tracking logic. The bus state tracking logic simply presents state information at the correct time via system bus 101.

In one embodiment, IOQ comprises a plurality of entries wherein each entry translates to a current transaction on the pipelined bus. Each IOQ entry tracks the state of the transaction as well. In this manner, all bus agents may keep track of each transaction as it flows through the pipeline on the bus. For the presently described embodiment, the IOQ has a depth of "1" since the bus is de-pipelined for conversion to processor 11.

State machine 41 also communicates some of the information from the snoop event back to the bus tracking logic of system bus 101. In the event of a hit to a clean line, or a cache miss, state machine 41 simply reports this status to system bus 101 at the appropriate time. But if a hit occurs to a dirty line (i.e., the processor asserts HITM signal), this situation requires special handling since processor 11 is designed to immediately output dirty data.

When an ADS# signal is detected by state machine 41 following a snoop hit, this means that dirty data will be immediately sent out by processor 11. Since the signaling protocol of system bus 101 does not allow data to be dumped in this manner, dirty data buffer 42 captures the data as it is output from processor 11 so that it could be sent onto bus 101 at the appropriate time. This process is, of course, under the control of snoop result conversion state machine 41. The bus state tracking logic in the IOQ is also coupled to dirty data buffer 42 in the implementation of FIG. 9 since it has the information indicating when dirty data may be sent on system bus 101 to complete the transaction.

Alternatively, snoop result conversion state machine 41 may use the BRDY# signal to throttle the data being output by processor 11. In this alternative implementation, buffer 42 may be eliminated, and the data bus lines from processor 11 may simply by tri-stated by tri-state devices 43 before being coupled to system bus 101. Note that in this embodiment, BRDY# is used to indicate that the currently addressed device has accepted data from the Pentium® processor in response to a write. In other words, snoop result conversion state machine 41 operates to allow data to be transferred directly to system bus 101 by providing an appropriate handshake signal.

To reiterate, logic block 41 takes the snoop result from processor 11 and passes it to the IOQ, which is incorporated in bus interface 101. In the event that a HITM# signal is asserted by processor 11, snoop result conversion state machine 41 waits until the next ADS# signal has been output by processor 11, since that signals the beginning of the dirty data dump.

FIG. 10 illustrates the bus tracking logic unit 70, which comprises ordinary state machine and combinatorial logic. As shown, logic unit 70 includes bus protocol conversion finite state machine 72 and in-order queue 71. State machine 71 performs required protocol signal conversion between processor 11 and system bus 101. In-order queue 71 is utilized to keep track of the state of both buses, on opposite sides of the interface. IOQ 71 includes ordinary logic and register storage for holding bus state information, as specified in accordance with the protocol of system bus 101.

In addition to tracking the state of the signals shown on both sides of the bus interface, logic unit 70 also provides necessary handshaking signals, e.g., data transfer handshaking. (Note that in certain instances, the bus signals on opposite sides of the interface have closely related functions. For example, the ADS# signal coupled to processor 11 is a unidirectional address strobe signal. The corresponding conversion is to the ADS# signal of system bus 101, which is bidirectional in nature.)

As can be seen, bus tracking logic unit 70 converts various signals transmitted between system bus 101 and processor 11. Included within this group is the address parity error signal AERR# in accordance with one embodiment of the present invention. An agent detecting a parity error asserts the AERR# signal during the error phase of the transaction. All bus agents observe the AERR# and on the next clock abort the erroneous transaction by removing the transaction from the in-order queue and canceling all remaining phases associated with the transaction. The corresponding address parity signal on the processor side of the interface is APCHK#. In the event of an address parity error, processor 11 activates APCHK#.

Also included on the system bus side of the interface of logic unit 70 are signals HIT#/HITM#. HIT# and HITM# are used to indicate that a line is valid or invalid in the snooping agent, whether the line is in the modified (dirty) state in the caching agent, or whether the snoop phase needs to be executed. The HIT# and HITM# signals are used to maintain cache coherency at the system level. As explained previously, when a snooping agent asserts HITM# the agent assumes responsibility for writing back the modified line during the data phase (an implicit write-back). The DEFER# signal is also driven in the snoop phase. The DEFER# is deasserted to indicate that the transaction can be guaranteed in-order completion. An agent asserting DEFER# ensures proper removal of the transaction from the IOQ 71 by generating the appropriate response. The response signal group of a transaction occurs after a snoop phase of the same transaction and includes the signals RS#[2:0] which provide encodings describing the required snoop result. The response agent is the agent responsible for completing the transaction at the top of the IOQ 71. For write transactions, TRDY# is asserted by the response agent to indicate that it is ready to accept write or writeback data.

The data transfer signal group contains signals driven in the data phase and includes DBSY#/DRDY# (data bus busy and data ready). DRDY# indicates that valid data is on the bus and must be latched. The data bus owner asserts DRDY# for each clock in which valid data is to be transferred. DBSY# is used to hold the bus before the first DRDY# and between DRDY# assertions for a multiple clock data transfer. The snoop, response, and data phase signals are all tracked via IOQ 71.

Bus protocol conversion state machine 72 provides outputs to processor 11 that include the next address input (NA#). The NA# input is asserted by a device that requests that the next bus cycle be sent over the buses prior to the current cycle ending. The external write buffer empty (EWBE#) signal is provided to processor 11 to ensure that memory operations occur in order of execution (i.e., strong memory ordering). This ensures that all buffered writes are completed by executing the next instruction. As previously discussed, the BRDY# signal indicates that the currently addressed device has presented valid data on the data bus pins in response to a read, or that the currently addressed device has accepted data from the processor in response to a write. Similarly, KEN# is the cache control signal indicating whether a location being read is within cacheable address space. If an address is not cacheable, the KEN# line is driven inactive telling the processor not to perform a cache line-fill.

We claim:

1. A multiprocessor computer system comprising:
   a host processor;
   a system bus that operates according to a standard signaling protocol which is compatible with the host processor;
   one or more agents coupled to the system bus, the one or more agents being classified as either symmetric agent(s) or priority agent(s) on the system bus;
   a card coupled to the system bus, the card functioning as a symmetric agent on the system bus and including:
     an additional processor that operates according to a second signaling protocol which differs from the standard signaling protocol;
     a bus conversion device coupled to the additional processor and to the system bus that converts the standard signaling protocol of the system bus to the second signaling protocol, and vice-versa, so that information may be transferred between the additional processor and the host processor, the bus conversion device including arbitration conversion logic that obtains ownership of the system bus on behalf of the additional processor according to a priority algorithm.

2. The multiprocessor computer system of claim 1 wherein the card further comprises:
   a cache memory coupled to the additional processor; and
   the one or more agents includes a memory device, wherein information is transferred between the additional processor and the memory device via the bus conversion device.

3. The multiprocessor computer system of claim 1 wherein the bus conversion device further comprises:
   a bus lock converter that converts a first lock signal generated by the additional processor in conjunction with an atomic transaction into a second lock signal provided on the system bus in accordance with the standard signaling protocol.

4. The multiprocessor computer system of claim 1 wherein the system bus comprises a pipelined bus.

5. The multiprocessor computer system of claim 2 wherein the priority algorithm is a circular priority algorithm, the symmetric agents supporting distributed arbitration according to the circular priority algorithm.

6. The multiprocessor computer system of claim 3 wherein the outgoing request converter comprises:

a request cycling state machine that generates a system bus address strobe signal and control signals once the additional processor has gained ownership of the system bus and has asserted a processor address strobe signal;

multiplexer circuitry having a plurality of inputs and outputs selected by the control signals;

request encoding circuitry that converts various request-type signals from the additional processor to the system bus, the request-type circuitry being coupled to the multiplexer circuitry such that a single cycle request by the additional processor is sequenced into a dual cycle request on the system bus.

7. The multiprocessor computer system of claim 5 wherein the bus conversion device further comprises:

an outgoing request converter that converts each request from the additional processor into first and second request cycles on the system bus.

8. The multiprocessor computer system of claim 7 wherein the bus conversion device further comprises:

an incoming request converter that identifies a transaction on the system bus that is snoopable by the additional processor, the transaction being input by the incoming request converter to the additional processor.

9. The multiprocessor computer system of claim 8 wherein the bus conversion device further comprises:

a cache coherency control unit that receives a signal from the additional processor indicating either a cache hit, a cache hit to a modified line, or a cache miss, the cache coherency control unit being responsive to the cache hit to the modified line by asserting/de-asserting a ready signal that throttles dirty data from the modified line output by the additional processor to the system bus.

10. The multiprocessor computer system of claim 8 wherein the bus conversion device further comprises:

a cache coherency control unit that receives a signal from the additional processor indicating either a cache hit, a cache hit to a modified line, or a cache miss, the cache coherency control unit including a buffer that stores dirty data responsive to the cache hit to the modified line output from the additional processor, the dirty data then being sent to the bus by the cache coherency control unit in accordance with the standard signaling protocol.

11. A multiprocessor computer system which comprises:

a host processor that operates according to a first signaling protocol;

a pipelined system bus having a bus architecture compatible with the first signaling protocol;

a plurality of symmetric agents that arbitrate for ownership of the system bus according to an arbitration algorithm;

a slot having a plurality of terminal connections;

a card that plugs into a slot and functions as a symmetric agent on the system bus, the card housing a plurality of semiconductor devices and having a plurality of interface terminals that correspond to the terminal connections, the plurality of semiconductor devices including:

an additional processor having a plurality of pins that operates according to a second signaling protocol which differs from the first signaling protocol of the system bus;

a bus conversion device that converts the first signaling protocol of the pipelined system bus into the second signaling protocol of the additional processor and visa-versa, the bus conversion device having a first interface connected to the interface terminals which is compatible with the first signaling protocol of the system bus, and a second interface coupled to the pins of the additional processor which is compatible with the second signaling protocol of the processor, the bus conversion device including arbitration conversion logic that obtains ownership of the system bus on behalf of the additional processor according to the arbitration algorithm.

12. The multiprocessor computer system of claim 10 wherein the arbitration algorithm comprises a round-robin algorithm.

13. The multiprocessor computer system of claim 11 further comprising one or more priority agents that can gain immediate ownership of the system bus from one of the symmetric agents upon assertion of a priority request signal on the system bus.

14. The multiprocessor computer system of claim 11 wherein each symmetric agent has a unique agent identification (ID), and a rotating ID value that reflects which symmetric agent has a lowest priority for a next arbitration event.

15. The multiprocessor computer system of claim 12 wherein the card can gain immediate ownership of the system bus from one of the symmetric agents upon assertion of a priority request signal on the system bus.

16. The multiprocessor computer system of claim 14 wherein the bus conversion device further includes:

bus request logic that converts bus request signals of the additional processor to bus request signals of the system bus in accordance with the first signaling protocol;

an agent ID state machine coupled to the bus request logic that determines an agent ID for the bus conversion device in response to a RESET on the system bus;

a symmetric owner state machine coupled to the agent ID state machine, and bus request logic, that monitors a current state of the system bus and determines when the additional processor has obtained ownership of the system bus;

hold assertion logic coupled to the symmetric owner state machine that generates a hold signal input to the additional processor, the hold signal requesting the additional processor to relinquish ownership of the system bus.

17. The multiprocessor computer system of claim 16 wherein the bus conversion device further comprises:

an outgoing request converter that converts each request from the additional processor into first and second request cycles on the system bus; and an incoming request converter that identifies a transaction on the system bus that is snoopable by the additional processor, the transaction being input by the input request converter to the additional processor.

18. The multiprocessor computer system of claim 17 wherein the bus conversion device further comprises:

a cache coherency control unit that receives a signal from the additional processor indicating a cache hit to a modified line, the cache coherency control unit being responsive to the signal by throttling dirty data from the modified line output by the additional processor to the system bus.

19. The multiprocessor computer system of claim 17 wherein the bus conversion device further comprises a cache coherency control unit that receives a signal from the additional processor indicating a cache hit to a modified line, the cache coherency control unit also including a buffer that stores dirty data, the dirty data being output from the modified line by the additional processor being stored in the buffer and subsequently sent to the system bus by the cache coherency control unit in accordance with the first signaling protocol.

20. The multiprocessor computer system of claim 19 wherein the bus conversion device further comprises:
a bus lock converter that converts a first lock signal generated by the additional processor in conjunction with an atomic transaction into a second lock signal provided on the system bus in accordance with the first signaling protocol.

* * * * *